United States Patent
Acker, Jr. et al.

(10) Patent No.: US 9,761,139 B2
(45) Date of Patent: Sep. 12, 2017

(54) LOCATION BASED PARKING MANAGEMENT SYSTEM

(71) Applicant: WAL-MART STORES, INC., Bentonville, AR (US)

(72) Inventors: Joel Bennett Acker, Jr., Brush Prairie, WA (US); Richard Neil Cancro, Portland, OR (US); Douglas James Pedley, Portland, OR (US)

(73) Assignee: WAL-MART STORES, INC., Bentonville, AR (US)

( * ) Notice: Subject to any disclaimer, the term of this patent is extended or adjusted under 35 U.S.C. 154(b) by 0 days.

(21) Appl. No.: 13/723,056

(22) Filed: Dec. 20, 2012

(65) Prior Publication Data

US 2014/0176348 A1    Jun. 26, 2014

(51) Int. Cl.
*G08G 1/14* (2006.01)
*G08G 1/04* (2006.01)

(52) U.S. Cl.
CPC .............. *G08G 1/144* (2013.01); *G08G 1/04* (2013.01); *G08G 1/143* (2013.01); *G08G 1/146* (2013.01)

(58) Field of Classification Search
CPC  G08G 1/14; G08G 1/144; G08G 1/04; G08G 1/143; G08G 1/146; G07B 15/02
USPC ................... 340/932.2; 705/13, 32; 701/400
See application file for complete search history.

(56) References Cited

U.S. PATENT DOCUMENTS

| | | | |
|---|---|---|---|
| 5,940,481 A * | 8/1999 | Zeitman | 705/13 |
| 6,927,700 B1 | 8/2005 | Quinn | |
| 6,970,101 B1 * | 11/2005 | Squire | G08G 1/14 340/309.16 |
| 7,081,832 B2 | 7/2006 | Nelson | |
| 7,312,722 B2 | 12/2007 | Tillotson | |
| 7,538,690 B1 | 5/2009 | Kaplan | |
| 7,783,530 B2 * | 8/2010 | Slemmer et al. | 705/28 |
| 7,893,847 B2 | 2/2011 | Shanbhag | |
| 8,175,803 B2 | 5/2012 | Caraballo | |
| 2003/0112154 A1 * | 6/2003 | Yoakum | G07B 15/02 340/932.2 |
| 2005/0096974 A1 * | 5/2005 | Chagoly et al. | 705/13 |
| 2005/0280555 A1 * | 12/2005 | Warner, IV | 340/932.2 |
| 2007/0008181 A1 * | 1/2007 | Rollert et al. | 340/932.2 |
| 2008/0136674 A1 * | 6/2008 | Jang et al. | 340/932.2 |
| 2010/0302068 A1 * | 12/2010 | Bandukwala | H04W 4/046 340/932.2 |
| 2012/0078686 A1 * | 3/2012 | Bashani | 705/13 |
| 2012/0092192 A1 * | 4/2012 | Wong | 340/932.2 |
| 2012/0130872 A1 * | 5/2012 | Baughman | G07B 15/02 705/32 |
| 2012/0130891 A1 * | 5/2012 | Bogaard | G07B 15/02 705/40 |

(Continued)

*Primary Examiner* — Steven Lim
*Assistant Examiner* — Mancil Littlejohn, Jr.
(74) *Attorney, Agent, or Firm* — Bryan Cave LLP

(57) ABSTRACT

A method to provide an active parking system includes receiving, at a portable computerized device, parking preferences of a user for a parking facility of a retail store, determining, within a parking space index server, an availability status of each of a plurality of parking spaces of the parking facility, identifying, within a computerized device, a preferred parking location for the user based upon the parking preferences and the availability statuses, and displaying, at a computerized display, directions for the user to navigate to the preferred parking location.

18 Claims, 10 Drawing Sheets

(56) References Cited

U.S. PATENT DOCUMENTS

2012/0299749 A1* 11/2012 Xiao ..................... G08G 1/04
 340/932.2
2012/0326893 A1* 12/2012 Glezerman ............... 340/932.2
2013/0268187 A1* 10/2013 Scofield ............ G01C 21/3685
 701/400

* cited by examiner

LOCATION BASED PARKING MANAGEMENT SYSTEM

BACKGROUND INFORMATION

Field of the Disclosure

The present invention relates generally to a computer implemented method that manages parking spaces at specific store locations and communicates related information to individual customers. In particular, examples of the present invention are related to using cameras or other sensors to determine which parking spaces are unoccupied, comparing those spaces with an individual customer's preferences, and conveying the most direct route a customer has to take to get to a particular parking space.

Background

Portable computerized devices permit a user to collect and process data from surroundings. A portable computerized device can include a camera device configured to capture an image or a series of images which can collectively be defined as a video feed. Programming upon or accessible by the device can process the image or images to identify useful information. The device can include a digital display, which can display captured images or other data. The device can include wireless communication to acquire or send information to a remote server device. A device can additionally or alternatively include a microphone to record audio.

A portable electronic device can include software applications that determine the location of vehicles through capturing of images or series of images in a particular area. In another embodiment, a portable electronic device can include sensors located either above or below a parking area that can determine the presence of a vehicle and matching vacant spaces with a centralized database so that vacant spaces can be matched with a driver's preferences.

Directions to a user to navigate to a preferred parking location can be displayed upon a display device embodied as a portable computerized device in possession of the user. In another embodiment, directions to the user to navigate to a preferred parking location can be displayed upon a computerized sign in the parking facility or through electronic traffic signals or lighted arrows located in the parking facility. An exemplary computerized sign can include LED panels to provide a textual message and/or arrow indicators to the user.

Augmented reality includes software applications that superimpose computer generated images upon a view of the real world. In one embodiment, augmented reality can be operated upon a portable computerized device embodied as part of a vehicle's navigation system configured to project graphical images onto the in-dash display. In another embodiment, augmented reality could be operated upon a portable computerized device embodied as a vehicle's windshield configured as a HUD device to project graphical images upon the transparent glass of the windshield, such that the viewer sees the graphical images in the context of actual objects visible through the glass. In another embodiment, augmented reality can be operated upon a smart-phone, a tablet computer, or other similar devices.

Augmented reality can provide computer generated graphical images superimposed upon a visual scene of an area approximate to the viewer. In combination with image recognition and programming permitting identification of features in a view, graphical images can be projected to identify an object of interest in the view. Graphical images can be configured to interact in an amusing way or otherwise entertain the viewer. Graphical images can provide instruction or augment the view with supplemental information. By superimposing images upon a view of objects in the real world, the experience of the viewer can be enhanced with information, entertainment, or other graphical content.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 6A is a schematic illustrating an exemplary portable computerized device embodied as a portable navigation device configured to communicate with a head up display; and FIG. 6B is a schematic illustrating an exemplary portable computerized device embodied as a smart-phone;

FIG. 8A illustrates a first exemplary method to indicate to a desired parking space; and FIG. 8B illustrates a second exemplary method to indicate to a desired parking space;

Figure 1:
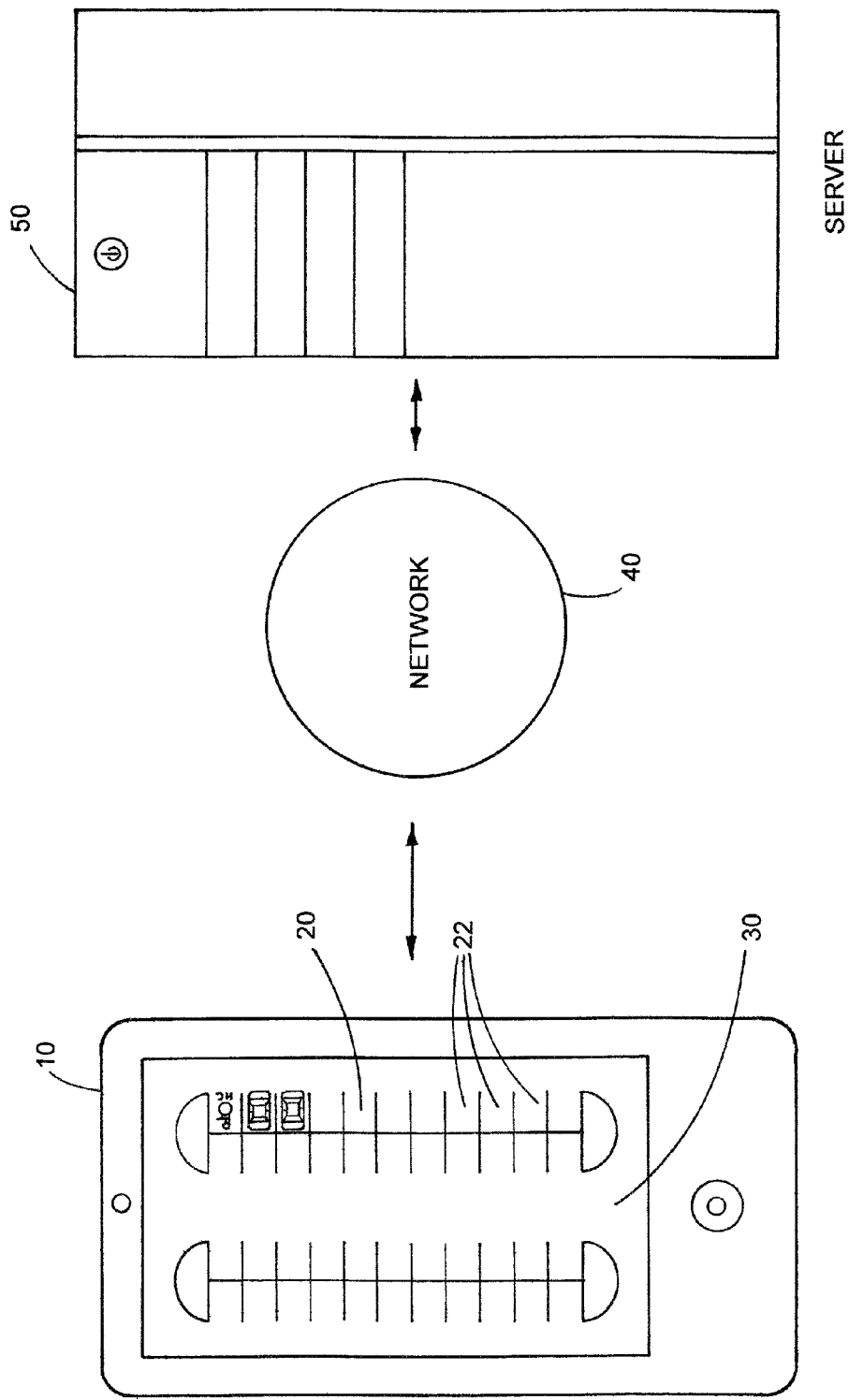
FIG. 1 is a schematic illustrating an exemplary portable computerized device in communication with an exemplary store parking space index server, according to some embodiments of the disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied on any tangible medium of expression having computer-usable program code embodied in the medium.

An individual wishing to customize parking options can utilize a portable computerized device such as a smart phone or their vehicle's navigation system to input and process user preferences. In one example, the individual can create a personal parking profile including preferred parking selections for a particular store or generally for similar stores. Based upon the parking preferences of the user, a preferred parking location can be provided to the user, wherein the preferred parking location can include a single preferred parking space or a range of preferred parking spaces, such an aisle or a group of parking spaces with a certain distance from a particular landmark. The individual can choose parking preferences by a variety of factors, including proximity to specific exits, presence of electronic vehicle (EV) charging stations, parking density, or even choose specific parking spaces or preferred parking aisles. The device monitors the location of the customer, and when the customer arrives in the parking lot, alerts the customer to possible parking options that the customer has saved in their user profile. The device can monitor an indication from the individual, which can be individually or a combination of a hand gesture, voice command, or an eye gaze location. Based upon the indication, the portable computerized device can identify the parking space corresponding to the indication and take action, such as reserve the parking space until the customer arrives at the parking space, give directions to the indicated parking space, or move on to the next preference the customer has set in their profile.

A personal parking profile for an individual can be stored within a server device for access by the individual upon arrival at a particular location. The personal parking profile can be established by using very specific location based criteria to select a preferred parking space, such as establishing the nearest available parking space to a specific exit. Exits can be identified by location, such as the southernmost exit, or by department located within the store, such as a garden center or grocery store exit. Parking preferences stored within the personal parking profile can also be established by factors such as parking density. For example, if a customer drives an oversized and expensive vehicle, options could be set to find the closest potential parking space while still maintaining a low overall parking density, allowing for close proximity to the store while still establishing a safe distance from other vehicles. Access to specific amenities could also be established in the personal parking profile. For example, if a customer drives an electric vehicle or plug in hybrid vehicle, preferences could be established to find the parking space with the ability to plug in while shopping. Another example might include a customer who requires handicapped parking. The personal parking profile could also establish a queue for curbside pickup, allowing for individuals to load oversized merchandise into their car in an orderly manner.

Identifying an available parking space can be accomplished according to a number of exemplary embodiments. For example, a portable computerized device can include software applications that determine the location of vehicles through capturing of images or series of images in a particular area. One embodiment of this might include the use of a store's security cameras to analyze images of the parking lot and establish occupied and unoccupied parking spaces. According to one embodiment, a plurality of images could be simultaneously analyzed to provide enhanced certainty regarding a status of a particular space. For example, if one image could not view a particular spot because of a large vehicle obscuring the view of the spot, a second image could be referenced to confirm the status of the spot. Another embodiment of the idea could include using sensors either underneath or above parking spaces to determine whether or not a space is empty. For example, a weight sensor could be installed below the parking space which could connect to the parking space index server via wired or wireless connection. Another embodiment of this could include using an inductive loop embedded in the pavement to detect presence of a vehicle. Another embodiment of this could include using an ultrasonic sensor situated proximately to a parking space in a multi-level parking structure to detect presence of a vehicle in the spot. A number of sensor configurations to evaluate whether a vehicle is in a parking space are envisioned, and the disclosure is not intended to be limited to the particular examples provided herein.

Navigating to a corresponding spot in a customer's preferred parking profile can be accomplished according to a number of exemplary embodiments. A portable computerized device within the vehicle of the user can include a position sensor to determined a current location of the vehicle, the device can access a map of the proximate parking lot, and directions to a particular parking space upon the parking lot can be generated based upon the current location, the map, and the parking space. The position sensor can be configured to generate a position signal indicative of the position of the vehicle. The position sensor can be configured to detect an absolute or relative position of the vehicle in relation to some landmark or reference point in the parking lot. The position sensor can electrically communicate a position signal containing position data to a remote processor managing parking assignments for the parking lot. Identifying the position of the user's vehicle can be accomplished by radio, ultrasound or ultrasonic, infrared, or any combination thereof. The position sensor 56 can be a component of a real-time locating system (RTLS), which is used to identify the location of objects and people in real time within a building such as a retail store. The position sensor can include a tag that communicates with fixed reference points located across the parking lot. The fixed reference points can receive wireless signals from the position sensor. The position signal can be processed to assist in determining one or more products that are proximate to the consumer and are visible in the video signal.

According to an another embodiment, global positioning system (GPS) coordinates can be used to acquire an approximate location of the vehicle. Methods are known to improve the accuracy of a location based upon GPS coordinates. For example, a set location in the parking lot can provide an accurate starting location, and location within the parking lot can be tracked based upon changes to the global positioning coordinates. Such an initial location can be acquired or determined with improved resolution by localizing a location of a device of the user by recognizing landmarks within the parking lot through pattern recognition software, for example, by recognizing parking aisle marker signs located on the ends of the parking aisles. In another embodiment, a plurality of localizing signals within and/or outside of the store could be used to determine a location of the device. For example, a radio transmitter within the store and signals from nearby cell towers could be used to triangulate a position of the device. Additionally or alternatively, accelerometers can also be used to track movement. A number of methods are known to locate and track movement of a device within a store parking lot, and the disclosure is not intended to be limited to the particular exemplary methods disclosed herein.

Operation of a head up display (HUD) or any portable computerized device as disclosed herein is dependent upon a computerized component. Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied as any tangible medium of expression having computer-usable program code embodied in the medium.

In one embodiment a HUD user enters a parking lot equipped with a system to actively manage assignment of parking space or an active parking system, at which time a greeting is displayed on the windshield of the vehicle along with options for choosing a particular parking space. By making a gesture, whether by hand gesture that can be captured by an in vehicle camera device, voice, an input through a human interface device (HID) such as a touch screen, or by other means, a selection of the preferred shopping space is made. Once the selection is made by the user, the parking space is "reserved", making it unavailable to other users in the parking lot who are also using the active parking system. The HUD then displays navigational information, directing the driver to the chosen parking space. Once the vehicle is parked, the driver may be given the option to have a "reminder" sent to a portable computerized device. This reminder sends the location of the vehicle to the user's personal portable computerized device, allowing the user to easily find the vehicle when leaving the store. The portable computerized device can, upon the user exiting the store, provide a map back to the vehicle, graphic or audio cues to get back to the vehicle, a row number designation for the parked vehicle, or any other indication to assist the user in getting back to the vehicle. Additionally or alternatively, once the vehicle is parked, the user will have the option to save or edit the preferences, allowing for specific parking criteria to be created based upon the user's recent decisions and experience. In the event a driver not using the active parking system or ignoring directions of the active parking system parks in the reserved spot, the system can choose an alternative spot for the user or permit the user to select a new spot and provide updated directions to the user.

In another embodiment, a stationary illuminated sign or lighted arrows are used to direct drivers to the preferred parking spaces. In one embodiment, as a driver enters the parking lot, a sign displays a personalized welcome message that also indicates where the driver's preferred parking space is located. For example, an LED sign may display the following message when a specific customer enters the parking lot, "Welcome back Jim, your preferred parking space in Aisle B, Row 4 is available." In another embodiment, lighted arrows or traffic lights could direct an arriving customer towards their preferred parking space. For example, lighted arrows or traffic lights could be mounted at the end of every aisle and indicate available spaces. If the traffic light is green, there are spaces available. If the light is red, there are no spaces available.

Software to receive user preferences regarding parking spaces, monitor parking spaces in a parking lot, and process and output available parking spaces to a user can be owned and controlled by a particular retail establishment. Such software can be specific to a particular retail location. Such software can be configured to operate at any retail store of a chain of stores. In another embodiment, some portion of the software can be published and distributed by a third party and operated on the HUD or portable computerized device owned by the customer. In one exemplary embodiment, particular stores or chains of stores can operate software to monitor and manage parking spaces for each of the stores, and a third party software application can be published and distributed that interacts with the software of multiple different chains of stores.

Wherein a store actively controls software to process parking preferences and assign parking spaces to particular users, the store can provide an accurate location and status of each parking space and include access to amenities within the parking lot to users of the program. Installation of the augmented reality program can be achieved by making the necessary software available for download from a website, purchase in known software formats, such as delivery by compact disk or by flash drive, or by any other known methods of software delivery and installation.

Hardware and software configurations of the systems disclosed herein can take many different embodiments. A program to receive customer inputs and/or display instructions to the customer can be installed upon a portable computerized device. In another embodiment, a portable computerized device can include programming configured permanently to the hardware of the device. In one embodiment, a single parking space index server can be utilized remotely to provide parking space locations in a plurality of stores, with communication of necessary information being transferred over a communications network. In another embodiment, a single remotely operated parking space index server can be used to provide parking locations for a single store. In one embodiment, a remote server can be used as a store parking space index server, and a second, local, in-store server can be used to permit local wireless communication between customers and the local server. In another embodiment, a store product index server can be local to a store. Communication between portable computerized devices and a store parking space index server can be over a cellular network, over a local network operated by the store, or by other communications methods known in the art.

Instructions, feedback, or other communication from an active parking system to a portable computerized device of a user within a vehicle can take a number of exemplary embodiments. A vehicle can be equipped with a display screen that can display text to the user. The display screen can additionally or alternatively provide a map graphic for the parking lot, for example, providing a current location of the vehicle, a location of a reserved parking space or a desired range of parking spaces, and a suggested route to get to the spot or range of spots. The display screen can additionally or alternatively provide a camera view in front of the vehicle with graphics directing the user superimposed over the camera view. In another embodiment, a HUD device can superimpose graphical images of text or other instructions upon a view of the user through the windscreen of the vehicle. In another embodiment, text, graphics, or other instructions can be provided through a smart-phone device, a tablet PC, through eyeglasses equipped to project graphics upon a view of the user visible through the eyeglasses, or other similar portable computerized device. Text, graphics, or other instructions can be provided upon a display in isolation, or text, graphics, or other instructions can be provided in the context of an augmented reality program providing information in the context of a view of the user.

To illustrate FIG. 1 is a schematic illustrating an exemplary portable computerized device in communication with an exemplary store parking space index server. Portable computerized device 10 is illustrated, including view 30 through device 10. Included within view 30 are a plurality of parking spaces 22 and preferred parking space 20. Device 10 is an smart-phone device including at least one input device configured to gather information and a processor configured to make determinations regarding data from the input device. Store parking space index server 50 is illustrated, including modules and associated programming to receive, process, and output information according to the methods disclosed herein. Server 50 and device 10 are in communication through exemplary wireless communications network 40.

Figure 2:
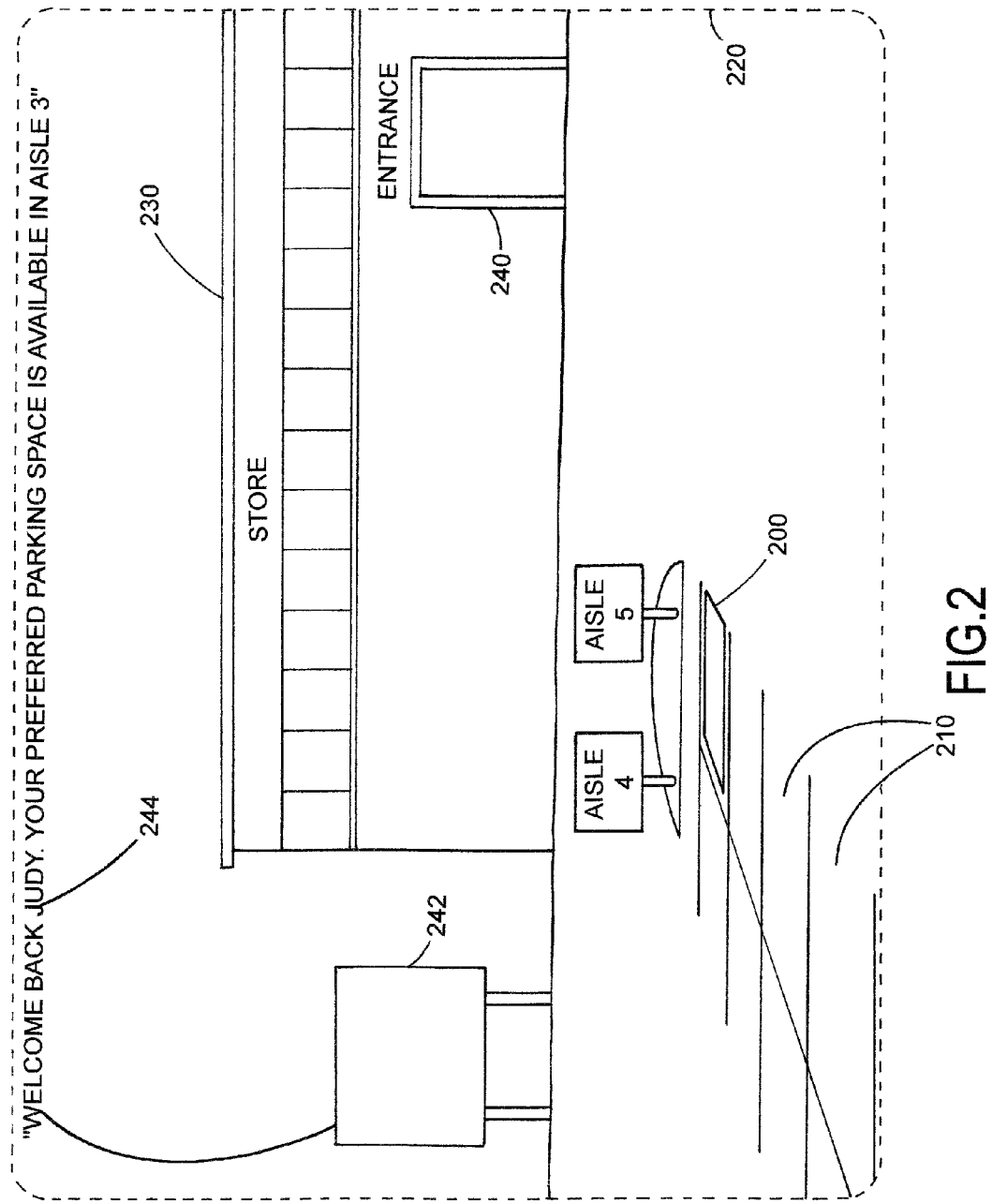
FIG. 2 illustrates an exemplary view of a parking lot outside a retail store including a preferred parking space shown in front of the store and a prompt welcoming the customer back to the store and asking if that customer would like to park in the predetermined preferred parking space, according to some embodiments of the disclosure.

FIG. 2 illustrates an exemplary view of available parking spaces in a store parking lot including a preferred parking space and a customized greeting to welcome the driver back to the store. View 220 can illustrate views available through an HUD device or a video feed projected upon a portable computerized device. Vacant parking spaces 210 are visible in the view. Further view 220 can include graphics projected upon the view of the individual using the device. A particular parking space can be indicated or selected according to the methods disclosed herein, and an indicating graphic 200 can be projected pointing to or highlighting the preferred parking space as defined by the customer's preferences. An accurate location to project graphic 200 upon a HUD as compared to a viewpoint of the driver can be determined based upon cameras within the vehicle, a seat position of the driver of the vehicle, a determination of a location of the parking space being indicated to relative to the vehicle, or by other methods known in the art. Additionally, message 244 can be projected upon view 220 prompting action from the individual, for example, prompting to select the preferred parking space, or select a secondary parking space. In another embodiment, sign 242 prompts the driver to action by message 244. Additionally or alternatively, sign 242 could indicate the driver's preferred spot is currently occupied, prompting the driver to choose an alternative parking space close to entrance 240 of store 230.

Figure 3:
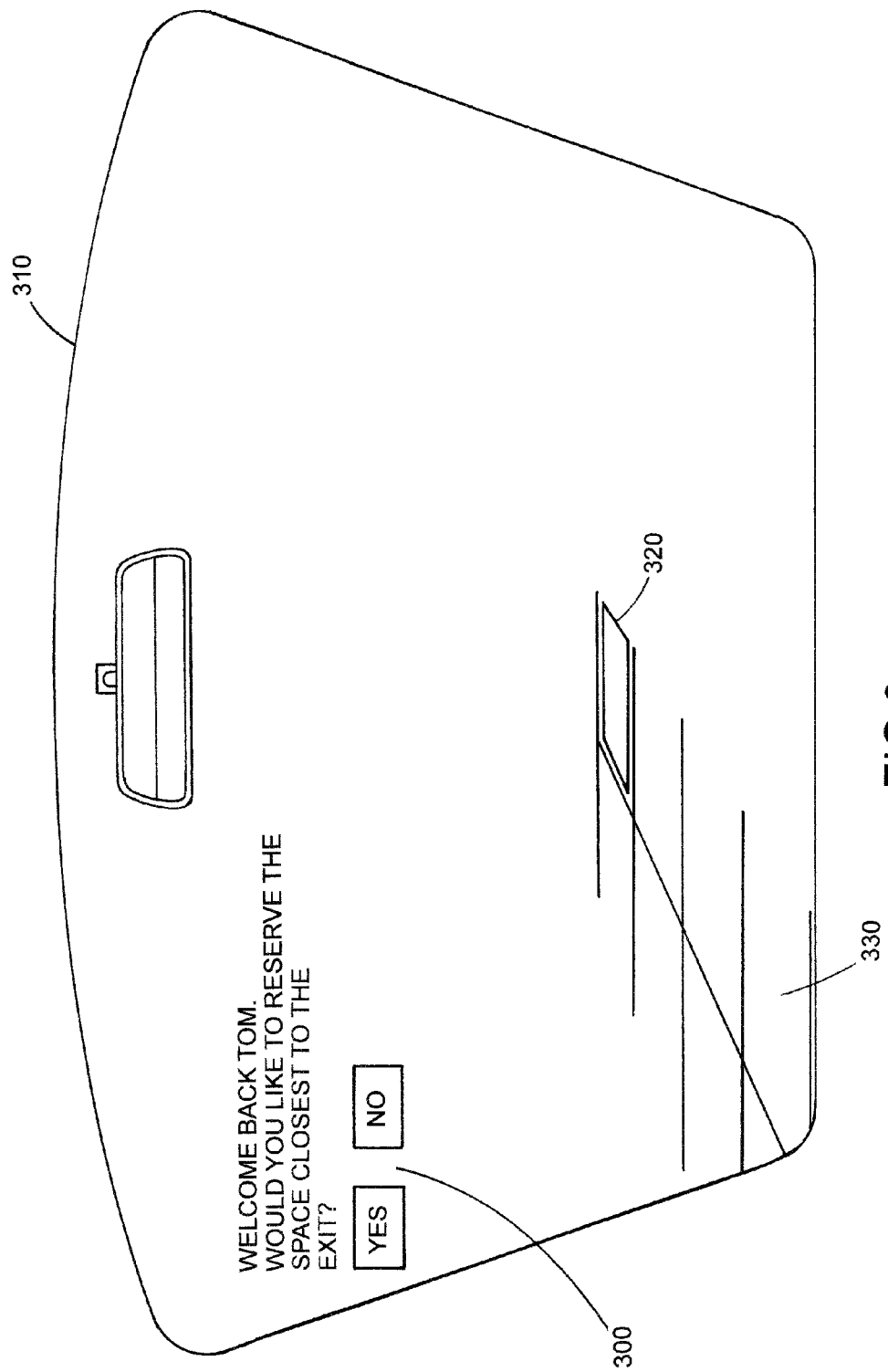
FIG. 3 illustrates an exemplary view through a windshield of a returning customer of a predetermined preferred parking space and graphics projected on the device illustrating different options the returning customer has in regards to parking, according to some embodiments of the disclosure.

FIG. 3. Illustrates an exemplary view through a head up display device of an available parking space that the driver has the option to reserve as well as additional graphics. View 310 includes available parking space 320 located within the store's parking lot 330. Through methods disclosed herein, the parking space can be indicated to the individual using the device, the spot can be identified within the store parking space index server, and details regarding the device can be displayed on the device. The device can, for example, access the store's parking space index server and determine if the available spot fits the criteria of preferred spot as defined by the driver's preferences. Exemplary message 300 prompts the driver to choose a parking space among those identified in the user's preference profile. Input of the customer responding to the prompt can be accepted through any of a number of envisioned input devices known in the art.

Figure 4:
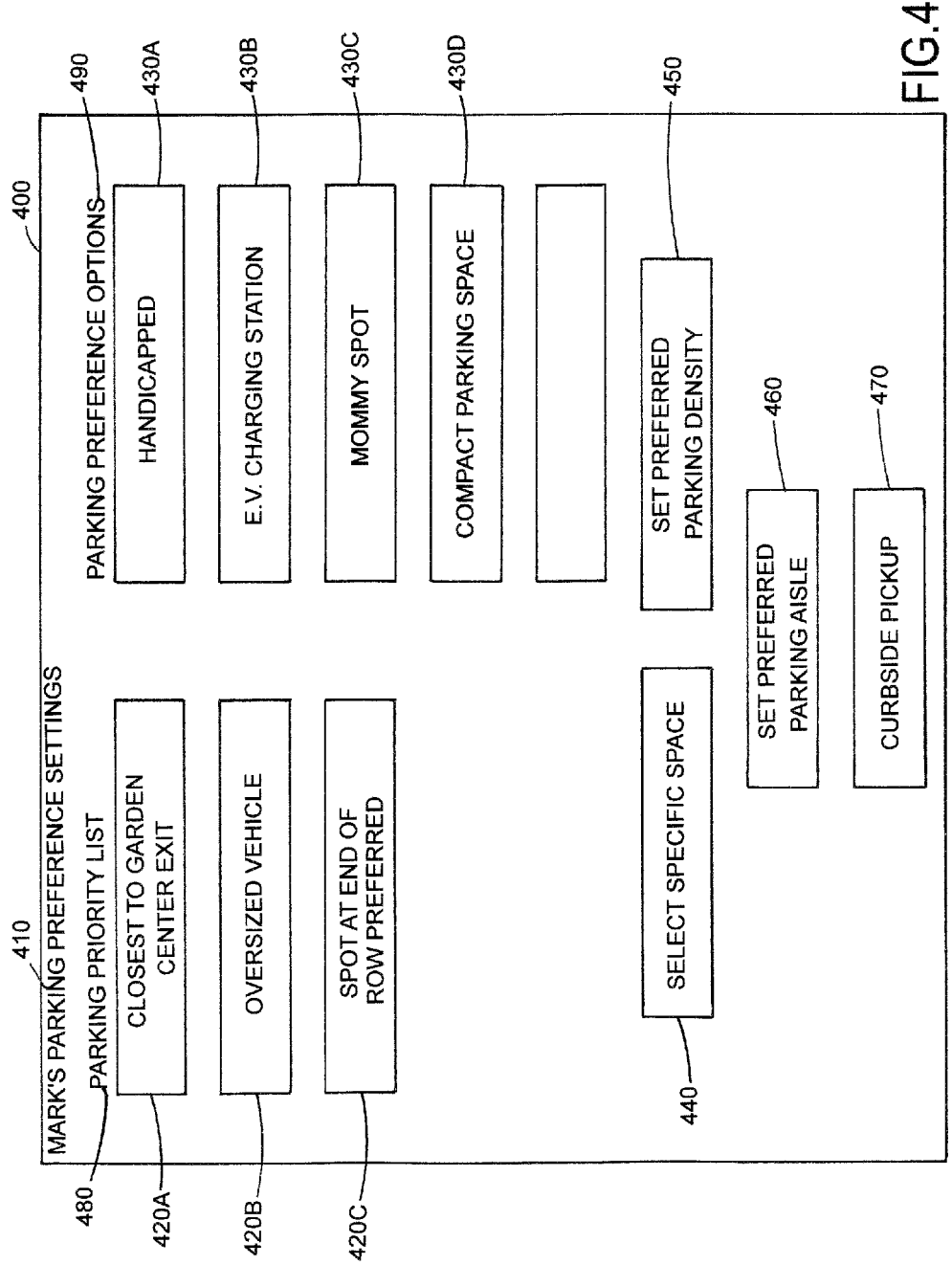
FIG. 4 illustrates an exemplary computer display showing potential options a customer can set for their parking preferences, according to some embodiments of the disclosure.

FIG. 4 illustrates an exemplary computer display showing a user's parking preference settings and various options for a customer regarding parking options. Such a display can be displayed at request or upon a vehicle entering a parking lot as a one-time selection by the user, or the display can represent a personal parking profile for a user or for a vehicle, permitting the user to save or edit preferences for a plurality of trips to the store. Display 400 includes a descriptive banner 410 identifying the individual user's preference settings. Display 400 further includes a plurality of parking preferences that may be selected and prioritized such that a parking space can be selected for the user. Column 490 includes a number of parking preferences 430A-D that have not yet been selected as a list of parking preference options, and column 480 includes a number of selected parking preferences 420 A-C that have been selected as a list of parking priorities. Display 400 can permit a user to provide input to the selected preferences, for example, by permitting the user drag and drop individual predefined parking options from column 490 to column 480, ranking the options from most important (at the top) to least important (at the bottom) of the column. According to the exemplary illustration, the user has selected a preference for a parking space closest to the garden center exit is a first priority 420A, a spot configured for an oversized vehicle as a second priority 420B, and a spot at an end of a row as a third priority 420C. According to the exemplary illustration, the user has not selected an option 430A to prefer a handicapped parking space, an option 430B to prefer an electronic vehicle charging station, an option 430C to select a spot reserved for a mommy, or an option 430D to select a compact parking space. Preferences may be mutually exclusive, for example, not permitting simultaneous selection of a preference for an oversized spot and a compact parking space. Preferences may require entry of a special code or require authorization from the store, for example, with the store requiring registration for a mommy spot. Display 400 further includes prompts to permit the user to input more specific criteria for deciding parking preferences including, but not limited to the selection of a specific space 440, selection of a specific aisle 460, and setting the preferred parking density 450. Further, view 400 allows for the driver to enter the queue for curbside pickup 470. A number of additional or alternative display options for display 400 are envisioned, and the disclosure is not intended to be limited to the particular example provided herein.

Figure 5:
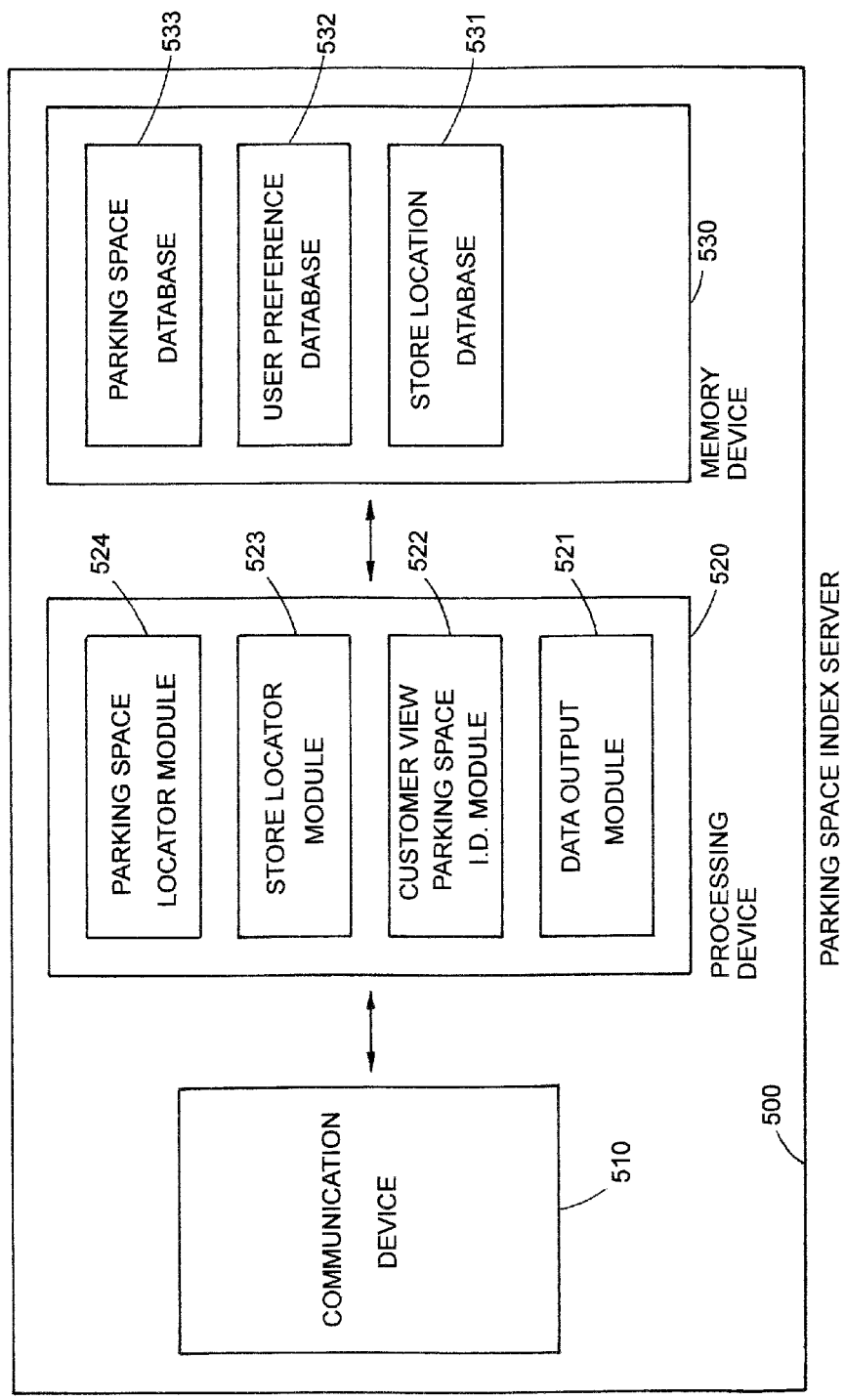
FIG. 5 is a schematic illustrating an exemplary parking space index server, according to some embodiments of the disclosure.

FIG. 5 is a schematic illustrating an exemplary store parking space index server. In the illustrated embodiment, the store parking space index server 500 may include a processing device 520, a communication device 510, and memory device 530.

The processing device 520 can include memory, e.g., read only memory (ROM) and random access memory (RAM), storing processor-executable instructions and one or more processors that execute the processor-executable instructions. In embodiments where the processing device 520 includes two or more processors, the processors can operate in a parallel or distributed manner. In the illustrative embodiment, the processing device 520 executes one or more of a store locator module 523, a parking space locator module 524, a customer view parking space identification (I.D.) module 522, and a data output module 521.

The communication device 510 is a device that allows the store parking space index server 500 to communicate with another device, e.g., a portable computerized device through a wireless communication network connection. The communication device 510 can include one or more wireless transceivers for performing wireless communication and/or one or more communication ports for performing wired communication.

The memory device 530 is a device that stores data generated or received by the store parking space index server 500. The memory device 530 can include, but is not limited to a hard disc drive, an optical disc drive, and/or a flash memory drive. Further, the memory device 530 may be distributed and located at multiple locations. The memory device 530 is accessible to the processing device 520. In some embodiments, the memory device 530 includes a store location database 531, a parking space database 533, and a user preference database 532.

In some embodiments, the store location database 531 can store the store locations of one or more stores operated or associated with a retailer. The store location database 531 may be queried using a specific location, e.g., GPS coordinates, or a general location, e.g., postal zip code or city/state, and can return one or more stores that are proximate to the specific or general location. The store location database 531 may further be configured to store maps corresponding to each store location. The store location database 531 may be queried with a store location and can return the store map corresponding to the store location.

In some embodiments, the parking space database 533 stores information about parking spaces including the location of parking spaces within a store's parking lot. The parking space database can be used to query a particular parking space available at location, or a class of parking spaces available near a certain location. For example, a location can provide that the device is located in front of an aisle of parking spaces adjacent to a particular exit to the store.

The parking space database 533 may further store a type of each parking space available at the store location, e.g., handicapped, electric vehicle (EV) charging station, and compact car spaces, and/or a section of parking spaces, e.g., aisle 5. Furthermore, the types and/or sections can be stored relative to each store location. In this way, the parking space database 533 can be queried with a store location and a parking space and can return a type of the parking space and/or a section of the parking space at the store location.

The parking space database 533 may further store other information about a particular product, including dimensions, pavement type, signal type, availability status, and similarity of the parking space to other available parking spaces.

User preference database 532 stores information about the user, for example, a set of preferences entered as the user enters a parking lot or a saved personal parking profile.

As discussed, the processing device 520 may execute the store locator module 523. The store locator module 523 receives a location from a portable computerized device and determines one or more store locations corresponding to the received location. In some embodiments, the store locator module 523 queries the store location database 531 with the received location and receives one or more store locations that correspond to the received location. For example, the store location database 531 may return any store locations that are within a predetermined distance, e.g., 10 miles, from the received location. When more than one store location is received, the store locator module 523 may automatically select the store location nearest to the received location or may provide the store locations to the portable computerized device, thereby allowing the portable computerized device or the user to select the store location.

The parking space locator module 524 can reference the parking space database 533 and the user preference database 532 to determine a preferred parking space a range of available parking spaces that meet the criteria of the user. Customer view parking space I.D. module 522 can receive information from parking space locator module 524 and can determine information to graphically present a candidate preferred parking space to the user or present a range of available parking spaces to the user for selection. Data output module 521 can receive information from the parking space locator module 524 and the customer view parking space I.D. module 522 and process information for communication to the user and, in the example of a queue for curbside pick-up of oversized items, for communication to the store.

Identification of a particular parking space or a plurality of preferred parking spaces can be performed either in a server or in a portable computerized device. Particular modules provided in the exemplary schematics herein are exemplary, and the methods disclosed herein can be distributed according to a number of different embodiments. Information from both the server and from the portable computerized device can be made available to either the server or the portable computerized device for selection of a preferred parking location.

Figure 6A:
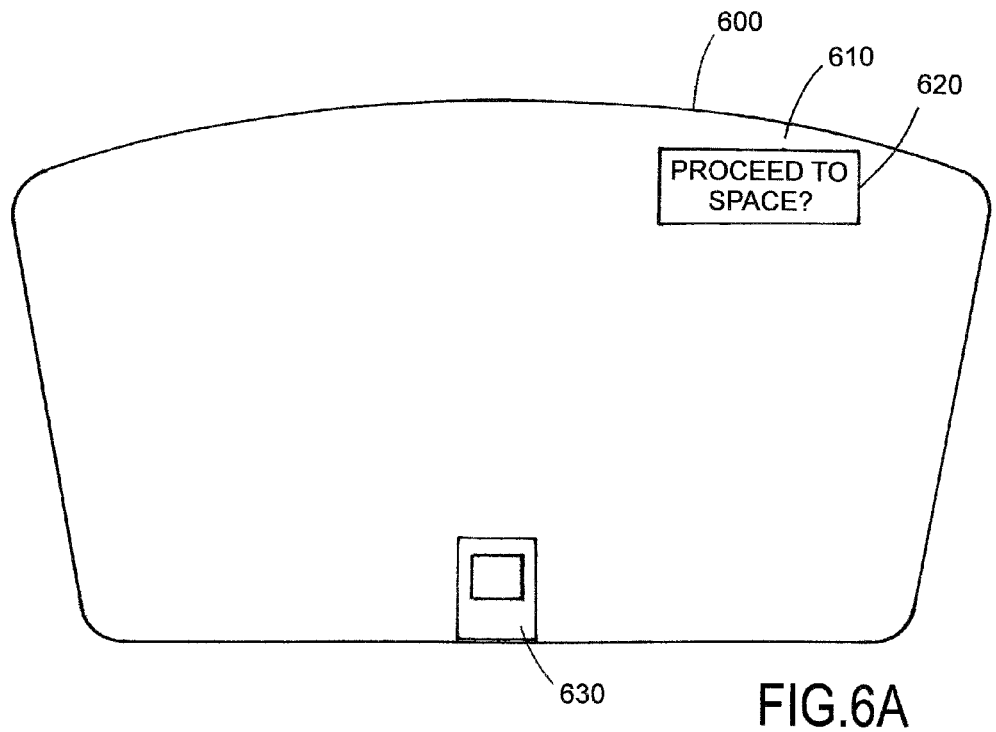
FIGS. 6A and 6B schematically illustrate exemplary portable computerized devices utilizing methods disclosed herein, according to some embodiments of the disclosure.
Figure 6B:
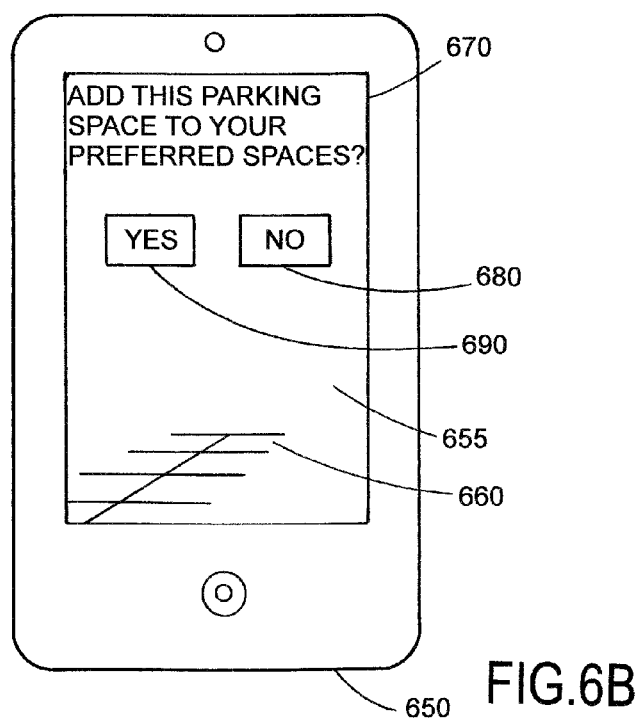

FIGS. 6A and 6B schematically illustrate exemplary portable computerized devices utilizing methods disclosed herein. FIG. 6A is a schematic illustrating an exemplary portable computerized device embodied as a portable navigation device configured to communicate with a head up display. Portable navigation device 630 includes programming to navigate the vehicle from a current location to a desired location. Portable navigation device can further be configured to communicate with a store parking space index server to provide an active parking system for the user. Portable navigation device 630 may communicate with vehicle systems to present information upon the vehicle HUD 600. HUD device 600 includes a display 610. Display 610 can present message 620 to the user, prompting the viewer to navigate to the parking space. FIG. 6B is a schematic illustrating an exemplary portable computerized device embodied as a smart-phone device. Device 650 includes a display. A parking space 660 is included upon display 655. Parking space 660 can be selected by the user, for example, by the user tapping on the screen at the location of the displayed parking space. In one embodiment, display 655 can present graphics as an augmented reality display, highlighting the image of the selected parking space. A message 670 prompting the user to confirm whether parking space 660 should be added to the driver's list of preferred spaces, including inputs 690 and 680 permitting the user to confirm or reject, respectively, the viewed parking space 660.

Figure 7:
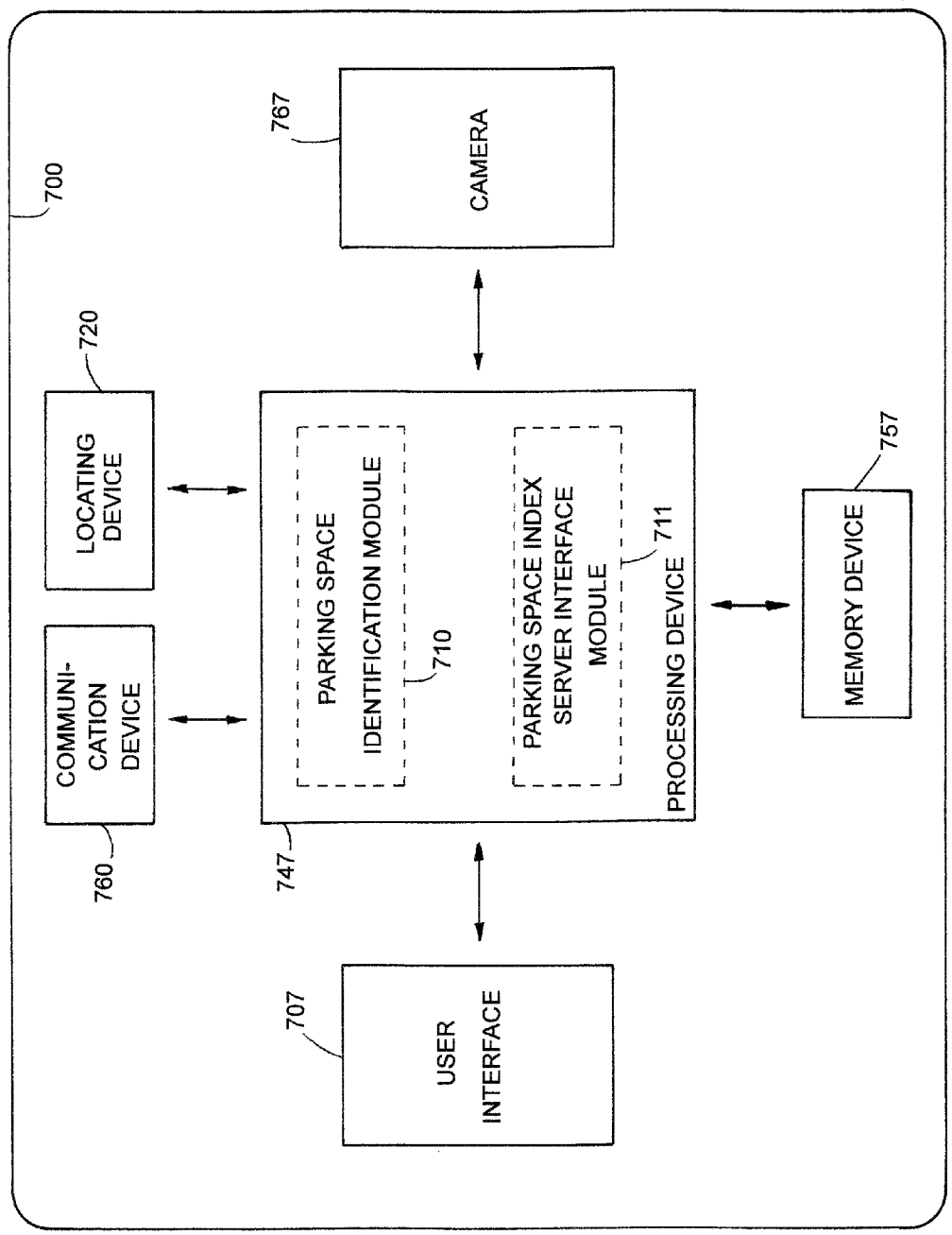
FIG. 7 is a schematic illustrating an exemplary portable computerized device configured to implement methods disclosed herein, according to some embodiments of the disclosure.

FIG. 7 is a schematic illustrating an exemplary portable computerized device configured to implement methods disclosed herein. Device 700 includes a processing device 747, a user interface 707, a communication device 760, a GPS device 720, a camera 767, and a memory device 757.

The processing device 747 can include memory, e.g., read only memory (ROM) and random access memory (RAM), storing processor-executable memory (ROM) and random access memory (RAM), storing processor-executable instructions and one or more processors that execute the processor-executable instructions. In embodiments where the processing device 747 includes two or more processors, the processors can operate in a parallel or distributed manner. In the illustrative embodiment, the processing device 747 can execute the operating system of the portable computerized device. In the illustrative embodiment, the processing device 747 also executes a parking space identification module 710 and a parking space index server interface module 711, which are described in greater detail below.

The user interface 707 is a device that allows a user to interact with the portable computerized device. While one user interface 707 is shown, the term "user interface" can include, but is not limited to, a touch screen, a physical keyboard, a mouse, a microphone, and/or a speaker. The communication device 760 is a device that allows the portable computerized device to communicate with another device, e.g., a store parking space index server. The communication device 760 can include one or more wireless transceivers for performing wireless communication and/or one or more communication ports for performing wired communication. The memory device 757 is a device that stores data generated or received by the portable computerized device. The memory device 757 can include, but is not limited to, a hard disc drive, an optical disc drive, and/or a flash memory drive.

The locating device 720 determines a location of the portable computerized device. Locating device 720 can utilize a GPS device communicating with a plurality of GPS satellites, a position sensor acting as a RTLS, for example, monitoring a current location based upon communication with a plurality of cell towers, or any other device capable of providing a location of the device.

The camera 767 is a digital camera that captures a digital photograph. The camera 767 receives an instruction to capture an image and captures an image of a view proximate to the camera. The digital photograph can be a bitmap file. The bitmap file can be a bitmap, a JPEG, a GIF, or any other suitably formatted file. The camera 767 can receive the instruction to capture the image from the processing device 747 and can output the digital photograph to the processing device 747.

Parking space identification module 710 monitors inputs that can be used to indicate a parking space. Parking space identification module 710, upon monitoring an indication to a parking space, can use image recognition, electronic sensors, or other methods to index the parking space. Information gathered by parking space identification module can be communicated to the parking space index server to particularly identify the parking space according to the methods disclosed herein.

Parking space index server interface module 711 interfaces with the store parking space index server to present options to the user for finding an appropriate parking space as defined by the user. Parking space index server interface module 711 further collects information through the user interface 707 regarding the user preferences and communicates the collected information to the parking space index server. Different embodiments of the disclosure can include parking space index server interface module 711 and a data output module of a store parking space index server implementing different portions of the tasks required to share the product information as disclosed herein.

Figure 10:
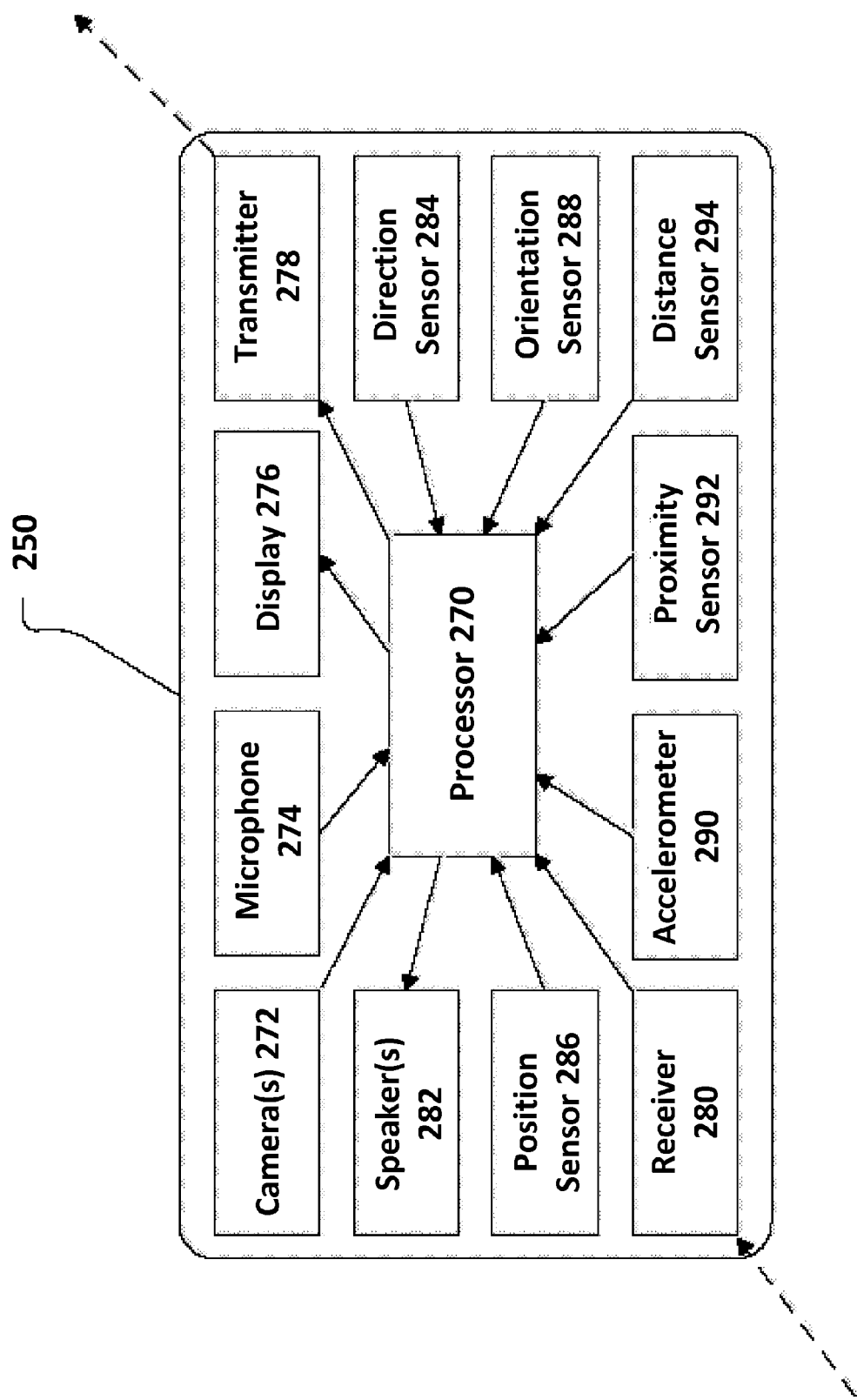
FIG. 10 is a block diagram illustrating exemplary components of the portable computerized device according to some embodiments of the disclosure.

FIG. 10 is a block diagram illustrating exemplary components of the portable computerized device 250. Portable computerized device 250 can include exemplary eyeglasses attached to a head mount unit configured to display graphics in a view of a user. The portable computerized device can include a processor 270, one or more cameras 272, a microphone 274, a display 276, a transmitter 278, a receiver 280, one or more speakers 282, a direction sensor 284, a position sensor 286, an orientation sensor 288, an accelerometer 290, a proximity sensor 292, and a distance sensor 294.

The processor 270 can be operable to receive signals generated by the other components of the portable computerized device 250. The processor 270 can also be operable to control the other components of the portable computerized device 250. The processor 270 can also be operable to process signals received by a device configured as a head mount unit. While one processor 270 is illustrated, it should be appreciated that the term "processor" can include two or more processors that operate in an individual or distributed manner.

The a head mount unit can include one or more cameras 272. Each camera 272 can be configured to generate a video signal. One of the cameras 272 can be oriented to generate a video signal that corresponds to the field of view of the consumer wearing the head mount unit. Each camera 272 can be operable to capture single images and/or video and to generate a video signal based thereon. The video signal may be representative of the field of view of the consumer wearing the head mount unit.

In some embodiments of the disclosure, cameras 272 may be a plurality of forward-facing cameras 272. In such embodiments, the orientation of cameras 272 can be known and the respective video signals can be processed to triangulate an object with both video signals. This processing can be applied to determine the distance that the consumer is spaced from the object. Determining the distance that the consumer is spaced from the object can be executed by the processor 270 or by a commerce server using known distance calculation techniques.

Processing of the one or more, forward-facing video signals can also be applied to determine the identity of the object. Determining the identity of the object, such as the identity of a product in the retail store, can be executed by the processor 270 or by the commerce server. If the processing is executed by the commerce server, the processor 270 can modify the video signals to limit the transmission of data back to commerce server. For example, the video signal can be parsed and one or more image files can be transmitted to the commerce server instead of a live video feed. Further, the video can be modified from color to black and white to further reduce transmission load and/or ease the burden of processing for either the processor 270 or the commerce server.

In some embodiments of the present disclosure, the cameras 272 can include one or more inwardly-facing cameras directed toward the consumer's eyes. A video signal revealing the consumer's eyes can be processed using eye tracking techniques to determine the direction that the consumer is viewing. In one example, a video signal from an inwardly-facing camera can be correlated with one or more forward-facing video signals to determine the object the consumer is viewing.

The microphone 274 can be configured to generate an audio signal that corresponds to sound generated by and/or proximate to the consumer. The audio signal can be processed by the processor 270 or by the commerce server. For example, verbal signals can be processed by the commerce server such as "this product appears interesting." Such audio signals can be correlated to the video recording.

The display 276 can be positioned within the consumer's field of view. Video content can be shown to the consumer with the display 276. The display 282 can be configured to display text, graphics, images, illustrations and any other video signals to the consumer. The display 276 can be a transparent when not in use and partially transparent when in use to minimize the obstruction of the consumer's field of view through the display 276.

The transmitter 278 can be configured to transmit signals generated by the other components of the portable computerized device 250 from the head mount unit. The processor 270 can direct signals generated by components of the portable computerized device 250 to the commerce sever through the transmitter 278. The transmitter 278 can be an electrical communication element within the processor 270. In one example, the processor 270 is operable to direct the video and audio signals to the transmitter 278 and the transmitter 278 is operable to transmit the video signal and/or audio signal from the head mount unit, such as to the commerce server through a communications network.

The receiver 280 can be configured to receive signals and direct signals that are received to the processor 270 for further processing. The receiver 280 can be operable to receive transmissions from the network and then communicate the transmissions to the processor 270. The receiver 280 can be an electrical communication element within the processor 270. In some embodiments of the present disclosure, the receiver 280 and the transmitter 278 can be an integral unit.

The transmitter 278 and receiver 280 can communicate over a Wi-Fi network, allowing the head mount device to exchange data wirelessly (using radio waves) over a computer network, including high-speed Internet connections. The transmitter 278 and receiver 280 can also apply Bluetooth® standards for exchanging data over short distances by using short-wavelength radio transmissions, and thus creating personal area network (PAN). The transmitter 278 and receiver 280 can also apply 3G or 4G, which is defined by the International Mobile Telecommunications-2000 (IMT-2000) specifications promulgated by the International Telecommunication Union.

The head mount unit can include one or more speakers 282. Each speaker 282 can be configured to emit sounds, messages, information, and any other audio signal to the consumer. The speaker 282 can be positioned within the consumer's range of hearing. Audio content transmitted by the commerce server can be played for the consumer through the speaker 282. The receiver 280 can receive the audio signal from the commerce server and direct the audio signal to the processor 270. The processor 270 can then control the speaker 282 to emit the audio content.

The direction sensor 284 can be configured to generate a direction signal that is indicative of the direction that the consumer is facing. The direction signal can be processed by the processor 270 or by the commerce server. For example, the direction sensor 284 can electrically communicate the direction signal containing direction data to the processor 270 and the processor 270 can control the transmitter 278 to transmit the direction signal to the commerce server through the network. By way of example and not limitation, the direction signal can be useful in determining the identity of a product(s) visible in the video signal, as well as the location of the consumer within the retail store.

The direction sensor 284 can include a compass or another structure for deriving direction data. For example, the direction sensor 284 can include one or more Hall effect sensors. A Hall effect sensor is a transducer that varies its output voltage in response to a magnetic field. For example, the sensor operates as an analog transducer, directly returning a voltage. With a known magnetic field, its distance from the Hall plate can be determined. Using a group of sensors disposing about a periphery of a rotatable magnetic needle, the relative position of one end of the needle about the periphery can be deduced. It is noted that Hall effect sensors can be applied in other sensors of the head mountable unit.

The position sensor 286 can be configured to generate a position signal indicative of the position of the consumer within the retail store. The position sensor 286 can be configured to detect an absolute or relative position of the consumer wearing the head mountable unit. The position sensor 286 can electrically communicate a position signal containing position data to the processor 270 and the processor 270 can control the transmitter 278 to transmit the position signal to the commerce server through the network.

Identifying the position of the consumer can be accomplished by radio, ultrasound or ultrasonic, infrared, or any combination thereof. The position sensor 286 can be a component of a real-time locating system (RTLS), which is used to identify the location of objects and people in real time within a building such as a retail store. The position sensor 286 can include a tag that communicates with fixed reference points in the retail store. The fixed reference points can receive wireless signals from the position sensor 286. The position signal can be processed to assist in determining one or more products that are proximate to the consumer and are visible in the video signal.

The orientation sensor 288 can be configured to generate an orientation signal indicative of the orientation of the consumer's head, such as the extent to which the consumer is looking downward, upward, or parallel to the ground. A gyroscope can be a component of the orientation sensor 288. The orientation sensor 288 can generate the orientation signal in response to the orientation that is detected and communicate the orientation signal to the processor 270. The orientation of the consumer's head can indicate whether the consumer is viewing a lower shelf, an upper shelf, or a middle shelf.

The accelerometer 290 can be configured to generate an acceleration signal indicative of the motion of the consumer. The acceleration signal can be processed to assist in determining if the consumer has slowed or stopped, tending to indicate that the consumer is evaluating one or more products for purchase. The accelerometer 290 can be a sensor that is operable to detect the motion of the consumer wearing the head mountable unit. The accelerometer 290 can generate a signal based on the movement that is detected and communicate the signal to the processor 270. The motion that is detected can be the acceleration of the consumer and the processor 270 can derive the velocity of the consumer from the acceleration. Alternatively, the commerce server can process the acceleration signal to derive the velocity and acceleration of the consumer in the retail store.

The proximity sensor 292 can be operable to detect the presence of nearby objects without any physical contact. The proximity sensor 292 can apply an electromagnetic field or a beam of electromagnetic radiation such infrared and assess changes in the field or in the return signal. Alternatively, the proximity sensor 292 can apply capacitive photoelectric principles or induction. The proximity sensor 292 can generate a proximity signal and communicate the proximity signal to the processor 270. The proximity sensor 292 can be useful in determining when a consumer has grasped and is inspecting a product.

The distance sensor 294 can be operable to detect a distance between an object and the head mount unit. The distance sensor 294 can generate a distance signal and communicate the signal to the processor 270. The distance sensor 294 can apply a laser to determine distance. The direction of the laser can be aligned with the direction that the consumer is facing. The distance signal can be useful in determining the distance to an object in the video signal generated by one of the cameras 272, which can be useful in determining the consumer's location in the retail store.

Figure 8A:
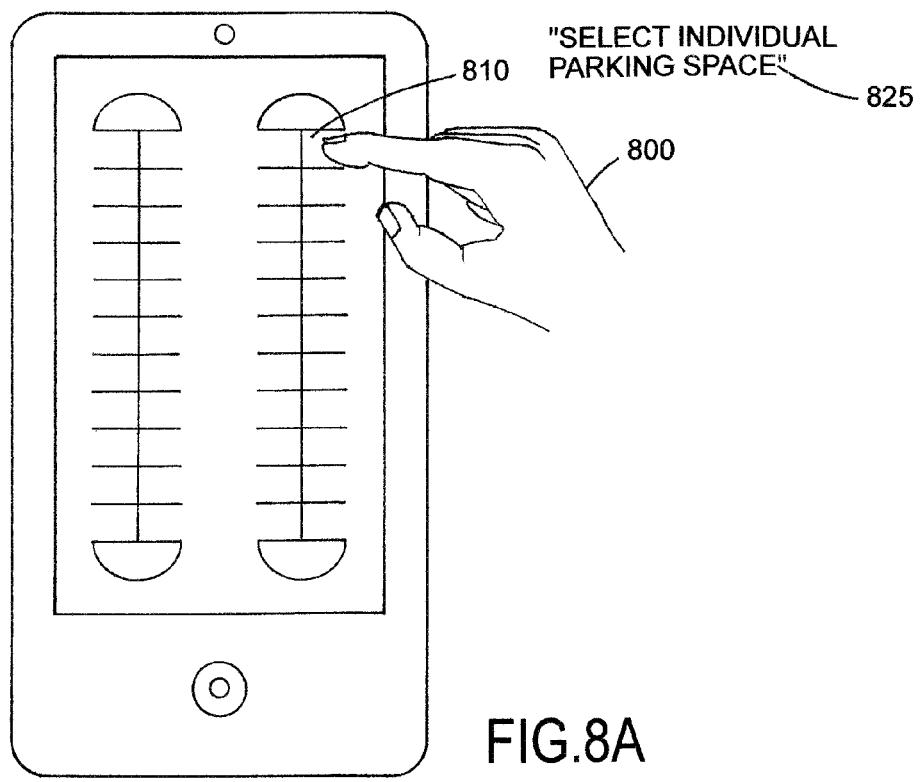
FIGS. 8A and 8B illustrate exemplary hand gestures and other information that can be used to select and save a preferred parking space, according to some embodiments of the disclosure.
Figure 8B:
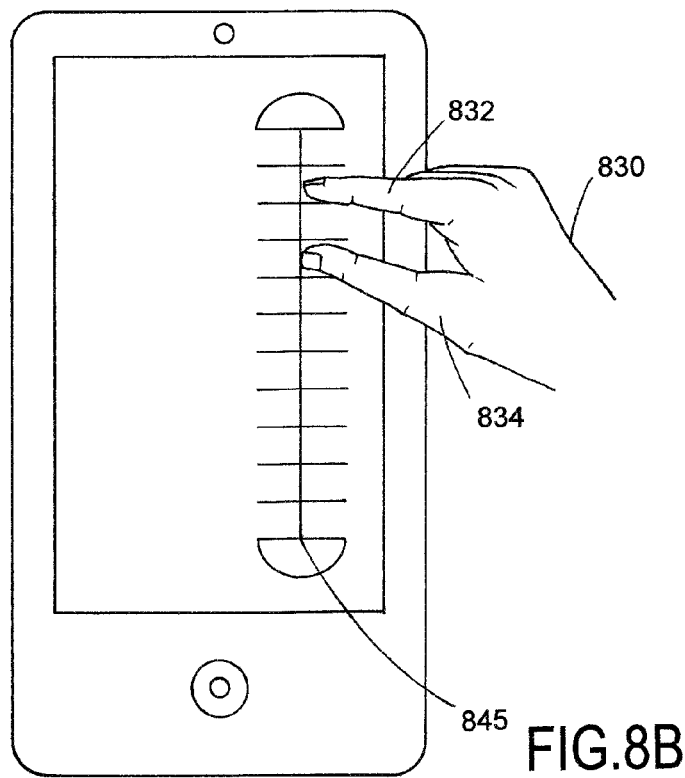

A hand gesture for identifying a parking space within a parking lot can include a number of embodiments. FIGS. 8A and 8B illustrate exemplary hand gestures and other information that can be used to select a parking space, or other types of data input. FIG. 8A illustrates a finger pointing at an exemplary parking space and an accompanying verbal cue to identify the parking space for a driver's preferred parking space list. Hand 800 is illustrated pointing to individual parking space 810. Image recognition programming within a portable computerized device can recognize an extended index finger as an indication to a parking space. Further, a voice prompt initiating the device to look for the extended finger can optionally be used. A verbal prompt 825 by the user is illustrated, with the user instructing the device to look for the extended finger.

FIG. 8B illustrates an index finger and a thumb indexing an exemplary parking aisle to identify an entire aisle as a customers preferred parking area. Hand 830 is illustrated including index finger 832 and thumb 834 in a pinching gesture. The finger and thumb are illustrated indicating to an aisle of parking 845. The gesture of pinching the fingers toward the parking aisle 845 can be used as a gesture to indicate to the aisle has been selected as part of the customer's preferred parking area. In another example, the parking spaces between the fingers could be selected as a range of preferred parking spaces. In another example, a finger circling a set of spaces could be used to select the circled parking spaces as a range of preferred parking spaces.

Figure 9:
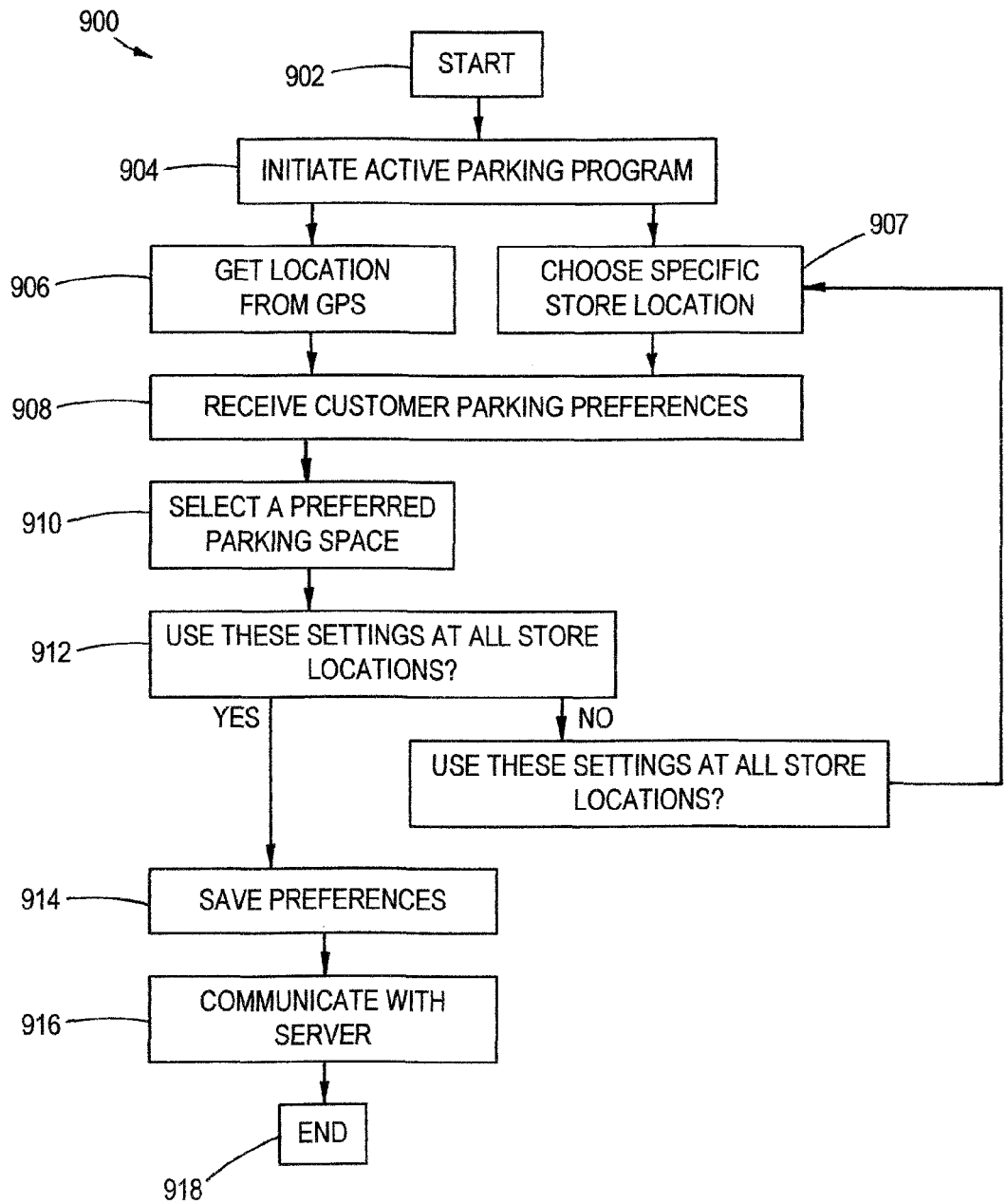
FIG. 9 is a flowchart illustrating an exemplary process to create a user profile and establish parking preferences on a portable computerized device, according to some embodiments of the disclosure.

FIG. 9 is a flowchart illustrating an exemplary process to create or modify a personal parking profile with a portable computerized device. Process 900 operates within a portable computerized device and begins at step 902. At step 904, the user initiates an active parking system program. At step 906, a location for the vehicle is monitored. At step 907, either the user or the program selects a specific store for parking. At step 908, parking preferences of the user are received, for example, by providing inputs to the user or by referencing a saved personal parking profile. At step 910, a preferred parking space can be selected. Alternatively, a range of preferred parking spaces or parking aisles may also be selected. At step 912, the customer has the option of setting this as the default parking space location profile for all store locations for a chain of stores or generically for all stores at which the system is used. If the user declines, process 900 advances to step 907, whereat a new set of preferences may be entered for a different store. If the user accepts using the settings at all store locations, process 900 continues to step 914. At step 914, the user of the device is prompted to save the preferences. At step 916 the user profile is communicated to a server. At step 918, the process ends. The process illustrated is a non-limiting example. A number of exemplary processes are envisioned, including a process not monitoring the location the device, or a process wherein the user's preferences are updated in real-time to the server, are envisioned. The disclosure is not intended to be limited to the exemplary process provided.

It is noted that the various processing functions set forth above can be executed differently than described above in order to enhance the efficiency of an embodiment of the present disclosure in a particular operating environment. The processor 747 can assume a greater role in processing some of the signals in some embodiments of the invention. For example, in some embodiments, the processor 747 on a head mountable unit could modify the video stream to require less bandwidth. The processor 747 could convert a video signal containing color to black and white in order to reduce the bandwidth required for transmitting the video signal. In some embodiments, the processor 747 could crop the video, or sample the video and display frames of interest. A frame of interest could be a frame that is significantly different from other frames, such as a generally low quality video having an occasional high quality frame. Thus, in some embodiments, the processor 747 could selectively extract video or data of interest from a video signal containing data of interest, and other data. Further, the processor 747 could process audio signals received through a microphone, such signals corresponding to audible commands from the consumer.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A computer-implemented method comprising:
   initiating an active parking system program on a portable computerized device of a user;
   monitoring a location of the portable computerized device used by the user in a vehicle;
   selecting a specific retail store for parking by either the user or the active parking system program based on the location, as monitored;
   displaying, on a display of the portable computerized device of the user, a plurality of parking preferences for a parking facility of the specific retail store equipped with the active parking system program to actively manage assignment of a plurality of parking spaces, the display displaying the plurality of parking preferences that may be selected and prioritized by the user either upon a request by the user or upon the vehicle entering the parking facility;
   determining, within a parking space index server, an availability status of each of the plurality of parking spaces of the parking facility;
   determining a preferred parking space or a preferred range of parking spaces for the user based upon the availability status and the plurality of parking preferences of the user;
   displaying, at the portable computerized device, the preferred parking space or the preferred range of parking spaces to the user for selection, displaying a message and prompting an action from the user to select the preferred parking space or a parking space of the preferred range of parking spaces, the user selecting the preferred parking space or the parking space of the preferred range of parking spaces;
   displaying, at the portable computerized device, an option for the user to set the selected parking space as a default parking space of the user;
   reserving, by the active parking system program, the selected parking space and making the selected parking space unavailable to other users in the parking facility who are also using the active parking system program;
   displaying, at the portable computerized device, directions for the user to navigate to the selected parking space; and
   displaying, at the portable computerized device, an option for the user to have a reminder of a location of the selected parking space sent to the portable computerized device once the vehicle is parked to allow the user to find the vehicle when leaving the specific retail store.

2. The computer-implemented method of claim 1, wherein displaying the plurality of parking preferences comprises referencing a saved personal parking profile for the user.

3. The computer-implemented method of claim 1, wherein displaying the plurality of parking preferences comprises:
   presenting to the user a selectable parking preference; and
   monitoring a gesture of the user indicating to the selectable parking preference.

4. The computer-implemented method of claim 1, wherein determining the availability status of each of the plurality of parking spaces comprises monitoring data from a sensor configured to observe parked vehicles in the plurality of parking spaces.

5. The computer-implemented method of claim 4, wherein monitoring the data comprises monitoring an image from a camera device configured to observe the plurality of parking spaces.

6. The computer-implemented method of claim 1, wherein determining the availability status of each of the plurality of parking spaces comprises monitoring data from a plurality of sensors, each sensor configured to observe a parked vehicle in one of the plurality of parking spaces.

7. The computer-implemented method of claim 1, including selecting, within the portable computerized device, the preferred parking space or the parking space of the preferred range of parking spaces for the user.

8. The computer-implemented method of claim 1, wherein determining the preferred parking space or the preferred range of parking spaces for the user comprises identifying the preferred parking space or the preferred range of parking spaces within the parking space index server.

9. The computer-implemented method of claim 1, wherein displaying, at the portable computerized device, the directions for the user comprises displaying the directions upon a display of the portable computerized device selected from a smart-phone device, a tablet computer, a navigation device, a head up display of a vehicle of the user, eyeglasses configured to project images upon a view of the user, a computerized sign located in the parking facility, and traffic signals located in the parking facility.

10. The computer-implemented method of claim 1, further comprising:
    presenting, at the portable computerized device, a plurality of selectable parking preferences to the user;
    receiving a prioritized selection of the plurality of selectable parking preferences from the user; and
    saving the prioritized selection as a personal parking profile for the user, wherein displaying the plurality of parking preferences comprises referencing the personal parking profile.

11. The computer-implemented method of claim 10, wherein presenting the plurality of selectable parking preferences comprises presenting one of a handicapped parking space preference, a mommy spot parking space preference, an electric vehicle charging station parking space preference, an oversized vehicle parking space preference, a compact vehicle parking space preference, a low parking density parking space preference, a parking space preference indicated to a particular exit of the specific retail store, and a parking space preference indicated to a particular aisle.

12. The computer-implemented method of claim 10, wherein presenting the plurality of selectable parking preferences comprises presenting an option for the user to select an individual preferred parking space.

13. The computer-implemented method of claim 10, wherein presenting the plurality of selectable parking preferences comprises presenting an option for the user to select a range of preferred parking spaces.

14. A system to actively manage assignment of parking spaces for a parking facility of a retail store equipped with a server comprising:
   an active parking system program initiated on a portable computerized device of a user;
   a store locator module that determines a store location of the retail store whereat a user is going to park a vehicle by monitoring a location of the portable computerized device used by the user in a vehicle or the retail store for parking selected by either the user or the active parking system program based on the location of the portable computerized device, as monitored;
   a user database that stores information about the user including parking preferences selected and prioritized by the user either upon request by the user or upon the vehicle of the user entering the parking facility of the retail store;
   a parking space database that stores information about the parking spaces including a location of the parking spaces within the parking facility of the store location and a type of each parking space of the parking spaces available at the store location, wherein an availability status of the parking spaces at the store location of the retailer is maintained;
   a parking space locator module communicating with the parking space database and the user database to determine a preferred parking space or a preferred range of parking spaces for the user based upon the availability status and the parking preferences of the user, the parking preferences indicating parking spaces of the parking spaces within the parking facility preferred by the user; and
   a data output module that (1) receives information from the parking space locator module to determine information to graphically present the preferred parking space or the preferred range of parking spaces to the user for selection, (2) provides the information to graphically present, as determined, for display to the user, (3) displays a message that prompts an action from the user to select the preferred parking space or a parking space of the preferred range of parking spaces, the user selecting the preferred parking space or the parking space of the preferred range of parking spaces, (4) displays an option for the user to set the selected parking space as a default parking space of the user, the active parking system program (a) reserving the selected parking space, (b) making the selected parking space unavailable to other users in the parking facility who are also using the active parking system program, and (c) navigating the user to the selected parking space, and (5) displays an option for the user to have a reminder of a location of the selected parking space sent to the portable computerized device once the vehicle is parked to allow the user to find the vehicle when leaving the retail store.

15. The server of claim 14, further comprising a customer view parking space identification module determining information to graphically present a candidate preferred parking space to the user.

16. A non-transitory computer-readable medium storing computing instructions for operation of an active parking system program, the computing instructions operating upon a portable computerized device and configured to instruct the portable computerized device to perform acts, comprising:
   initiating an active parking system program on a portable computerized device of a user;
   monitoring a location of the portable computerized device used by the user in a vehicle;
   selecting a specific retail store for parking by either the user or the active parking system program based on the location, as monitored;
   displaying on a display of the portable computerized device of the user a plurality of parking preferences for a parking facility of the specific retail store equipped with the active parking system program to actively manage assignment of parking spaces, the display displaying the plurality of parking preferences that may be selected and prioritized by the user either upon a request by the user or upon the vehicle entering the parking facility;
   wirelessly transmitting, by the portable computerized device, the plurality of parking preferences to a remote parking space index server, wherein the remote parking space index server stores data for the parking facility regarding currently available parking spaces;
   determining, by the remote parking space index server, a preferred parking space or a preferred range of parking spaces for the user based upon the currently available parking spaces and the plurality of parking preferences of the user;
   displaying, at the portable computerized device, the preferred parking space or the preferred range of parking spaces to the user for selection and displaying a message and prompting an action from the user to select the preferred parking space or a parking space of the preferred range of parking spaces;
   displaying, at the portable computerized device, an option for the user to set the selected parking space as a default parking space of the user;
   wirelessly transmitting, by the portable computerized device, to the remote parking space index server, the preferred parking space or the parking space of the preferred range of parking spaces selected by the user, and the remote parking space index server reserving the selected parking space and making the selected parking space unavailable to other users in the parking facility who are also using the active parking system program;
   receiving, at the portable computerized device, instructions to navigate to the selected parking space at the parking facility;
   displaying, at the portable computerized device, the instructions to navigate to the selected parking space; and
   displaying, at the portable computerized device, an option for the user to have a reminder of a location of the selected parking space sent to the portable computerized device once the vehicle is parked to allow the user to find the vehicle when leaving the specific retail store.

17. The non-transitory computer-readable medium of claim 16, wherein the parking facility includes a plurality of available parking spaces.

18. The non-transitory computer-readable medium claim 17, wherein the plurality of available parking spaces are each preferred parking spaces of the user.

* * * * *